Patented Apr. 4, 1944

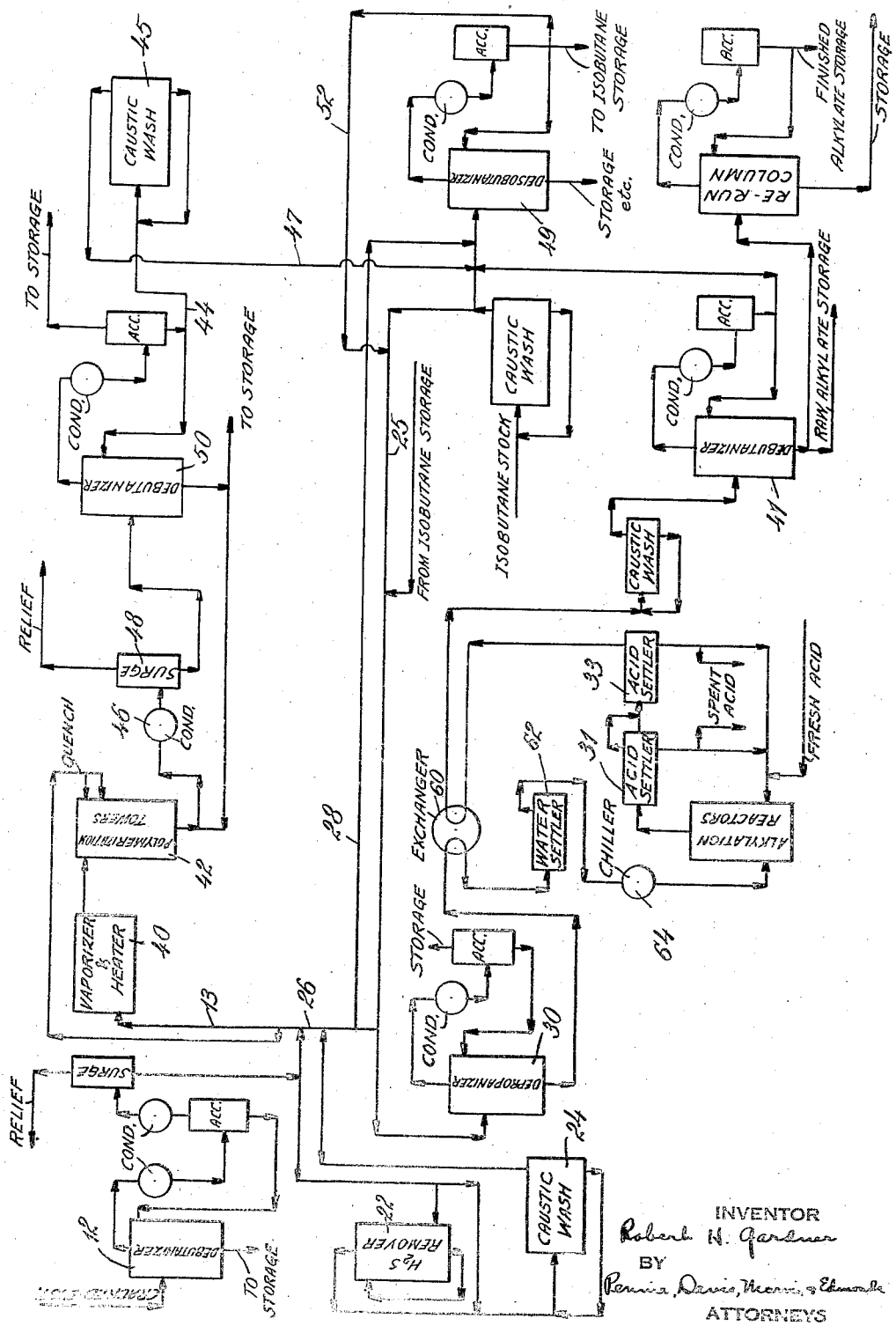

2,345,742

UNITED STATES PATENT OFFICE 2,345,742

PROCESS

Robert H. Gardner, Munster, Ind., assignor to Sinclair Refining Company, New York, N. Y., a corporation of Maine Application February 7, 1941, Serial No. 377,873

2 Claims. (Cl. 260—683.4)

This invention relates to improvements in the production of motor fuel by the alkylation of olefins, particularly butylenes, by isobutane by reaction in the presence of strong sulfuric acid.

Processes for the production of motor fuel by such alkylation operations are known, and in general involve the reaction of butylenes with isobutane in the presence of strong sulfuric acid at temperatures ranging from around 40° to 70° F., with the use of a large excess of isobutane in the reaction mixture, with agitation effective to permit intimate contact of the various components, etc. By such operations, it is possible to produce products available for aviation gasoline having an octane number (CFR motor method) ranging upwards of 90.

In the reaction mixture, at least two competing reactions take place, the alkylation referred to and reaction of the olefins alone, which apparently involves initial polymerization followed by decomposition to give saturated bodies and bodies having a greater degree of unsaturation than the olefins or polymers. To the extent that this olefin reaction takes place, the quality of the product obtained is reduced, or the yield is reduced, because any saturated products of proper boiling range for aviation fuel so produced lower the octane value of the final product, while any saturated products of improper boiling point reduce the yield and the unsaturated bodies apparently form stable complexes with the acid and increase acid consumption.

There are three isomeric butylenes (disregarding geometrical isomers), that is, isobutylene, butylene-1 and butylene-2. Of these, butylene-2 has a boiling point very close to that of butane, while the boiling point of butylene-1 and isobutylene, and also isobutane, are lower. Also of the butylenes, butylene-2 is the least reactive, while isobutylene is the most reactive, both in reactions involving only olefins, the alkylation reaction and other reactions.

From the standpoint of alkylate quality, measured in terms of value as an aviation gasoline, the alkylate produced from butylene-2 is not of as high quality as that produced from isobutylene. However, as a practical matter, the lesser reactivity of butylene-2 is reflected in its tendency to form olefin reaction products, so that under many conditions of operation, butylene-2 will give, on alkylation with isobutane, a better product than will isobutylene or butylene-1, because of a lesser production of such undesirable products. This better quality produced with butylene-2 is a result of the degree of admixture with products produced from olefins alone rather than to an inherent quality of the alkylate itself. Inherently, the alkylate from isobutylene is superior, but because, other conditions being the same, it usually contains a larger proportion of undesirable products, the alkylate ordinarily produced is of lower quality than that produced from butylene-1 or butylene-2, and the acid consumption usually higher, because of the increased formation of products which form stable complexes with the acid.

In accordance with the present invention, a motor fuel of high octane value, for example, 95 or higher, is produced from the gases of a cracked stock, together with any extraneous isobutane which may be available, by selectively supplying to the alkylation reaction zone the isobutylene and isobutane while minimizing the amount of butylene-2 supplied thereto and carrying out the alkylation reaction under conditions which are favorable for the production of alkylate, and in particular, at a low temperature, for example, 40° to 60° F., high ratio of isobutane to olefin and with intimate contact of the acid and the hydrocarbon phases provided by effective agitation. Under such conditions, alkylate having an octane number as high as 95 (CFR motor method) or higher may be produced in excellent yields, with low acid consumption ranging around 0.9 lb. per gallon or even lower. The important factors in carrying out the invention are the minimizing of the butylene-2 in the olefin feed and the carrying out of the reaction under conditions favorable to alkylation and which minimize the olefin interreactions which ordinarily radically reduce the quality of the product where major proportions of isobutylene are included in the olefin feed and increase the acid consumption.

The invention will be illustrated in connection with the appended flow sheet, which shows diagrammatically an integrated alkylation and polymerization plant adapted for the carrying out of the process of producing an olefin polymer useful as a motor fuel as well as a high quality alkylate from the gases of a cracked stock.

A cracked stock is debutanized in the debutanizer 12, the bottoms going to storage and the overhead, having the following composition:

|  | Per cent |
|---|---|
| Ethylene | 0.5 |
| Ethane | 5.0 |
| Propylene | 8.3 |
| Propane | 20.9 |
| Isobutane | 6.3 |
| Isobutylene | 10.5 |
| Butylene-1 | 7.0 |
| N-butane | 30.5 |
| Butylene-2 | 11.0 | being passed through the hydrogen sulfide removal tower 22 and the caustic washer 24 if necessary. The resulting hydrocarbon mixture, 2450 barrels per day, is proportioned at the point 26, 785 barrels going through the line 28 to the deisobutanizer 49 and 1665 barrels through the line 13 to the vaporizer and heater 40 and thence to the polymerization tower 42. The products of the polymerization operation are condensed in the condenser 46, pass to the surge tank 48 and then to the debutanizer 50. The bottoms from the debutanizer, 368 barrels per day, containing the polymer, are drawn off to storage. The overhead fraction, 1210 barrels per day, having the composition:

| | Per cent |
|---|---|
| Ethylene | 0.6 |
| Ethane | 6.9 |
| Propylene | 1.2 |
| Propane | 28.8 |
| Isobutane | 8.7 |
| Isobutylene | 1.4 |
| Butylene-1 | 2.0 |
| N-butane | 42.1 |
| Butylene-2 | 8.3 | is passed through the lines 44 and 47, after caustic washing in the caustic washer 45 to the deisobutanizer 49. Also fed to this deisobutanizer are 206 barrels per day of isobutane stock from outside sources having the composition:

| | Per cent |
|---|---|
| Propane | 35.7 |
| Isobutane | 28.6 |
| N-butane | 35.7 | and 820 barrels per day of overhead from the debutanizer 41, having the composition:

| | Per cent |
|---|---|
| Isobutane | 85.7 |
| N-butane | 14.3 | and derived as will be explained.

The overhead from the deisobutanizer 49, 2020 barrels per day, having the composition:

| | Per cent |
|---|---|
| Ethylene | 0.6 |
| Ethane | 6.1 |
| Propylene | 4.0 |
| Propane | 29.0 |
| Isobutane | 45.5 |
| Isobutylene | 5.0 |
| Butylene-1 | 3.9 |
| N-butane | 5.8 |
| Butylene-2 | 0.1 | is passed by the lines 52 and 25 to the depropanizer 30. The bottoms from the deisobutanizer, 1005 barrels per day, having the composition:

| | Per cent |
|---|---|
| N-butane | 81.7 |
| Butylene-2 | 18.3 | is discharged to storage, and may be used for fuel or gasoline blending to control refinery vapor pressure.

The overhead from the depropanizer 30, equivalent to 812 barrels per day, having the composition:

| | Per cent |
|---|---|
| Ethylene | 1.5 |
| Ethane | 15.1 |
| Propylene | 10.0 |
| Propane | 72.5 |
| Isobutane | 0.9 | is discharged to storage. The bottoms from the depropanizer 30, 1205 barrels per day, having the composition:

| | Per cent |
|---|---|
| Isobutane | 75.2 |
| Isobutylene | 8.3 |
| Butylene-1 | 6.5 |
| N-butane | 9.8 |
| Butylene-2 | 0.2 | is passed to the alkylation reaction zone through the heat exchanger 60, in which it is brought into heat exchange relationship with the hydrocarbon from the alkylation reaction, the water settler 62 and the chiller 64.

The reaction mixture from the alkylation is stratified in the settlers 31 and 33, the hydrocarbon passing through the heat exchanger 60, then being caustic washed and charged to the debutanizer 41. The overhead from this debutanizer, the composition of which is given above, is passed to the deisobutanizer 49, while the bottoms fraction, equivalent to 316 barrels per day, and consisting of hydrocarbons heavier than the five carbon atom hydrocarbons, is charged to the re-run column from which 300 barrels per day of alkylate having an octane number of 95.6 are obtained.

The alkylation reactor used in the operation described consisted of a vertical cylindrical vessel with a conical bottom provided with an inner annular sleeve extending from near the bottom to near the top and with a pump in the bottom which caused rapid circulation of the reaction mixture from the bottom upward between the sleeve and the wall of the vessel and down within the sleeve. The following table gives data pertinent to this operation.

| | | |
|---|---|---|
| Residence time | minutes | 35 |
| Acid in reactor mixture by volume | per cent | 47 |
| Acid strength, titratable acidity | weight per cent | 93 |
| Temperature of reaction mixture | °F | 50 |
| Pressure | lbs. gauge | 88 |
| Alkylate tops | per cent on total alkylate | 95 |
| Acid consumption | lbs. acid/gal. alkylate | 0.9 |

| Tests on alkylate: | Total | Tops |
|---|---|---|
| Gravity | 68.8 | 69.9 |
| Initial | 137 | 134 |
| 10% | 189 | 188 |
| 50 | 222 | 221 |
| 90 | 256 | 238 |
| E. P. | 385 | 344 |
| Octane number MM | --- | 95.6 |

Of course, other types of reactors, such as time tanks, provided with means for external recirculation and cooling, tubular reactors, etc., may be used.

I claim:

1. The process of producing high octane motor fuel from the four carbon atom hydrocarbon gases of a cracked stock which comprises (1) debutanizing a cracked stock, (2) dividing the overhead from the debutanizing into two fractions of similar composition each comprising isobutane, isobutylene and butylene-2, (3) subjecting one fraction to a polymerization operation to polymerize the olefin it contains, (4) debutanizing the product of the polymerization, (5) passing the other fraction and the overhead from the debutanizing of the polymer to a deisobutanizer and subjecting the overhead therefrom to an alkylation reaction.

2. The process as in the preceding claim in which the conditions of alkylation are favorable to the alkylation reaction and unfavorable to side reactions.

ROBERT H. GARDNER.